Dec. 19, 1933.  F. W. BURGER  1,939,952
METAL WHEEL
Filed Aug. 15, 1929
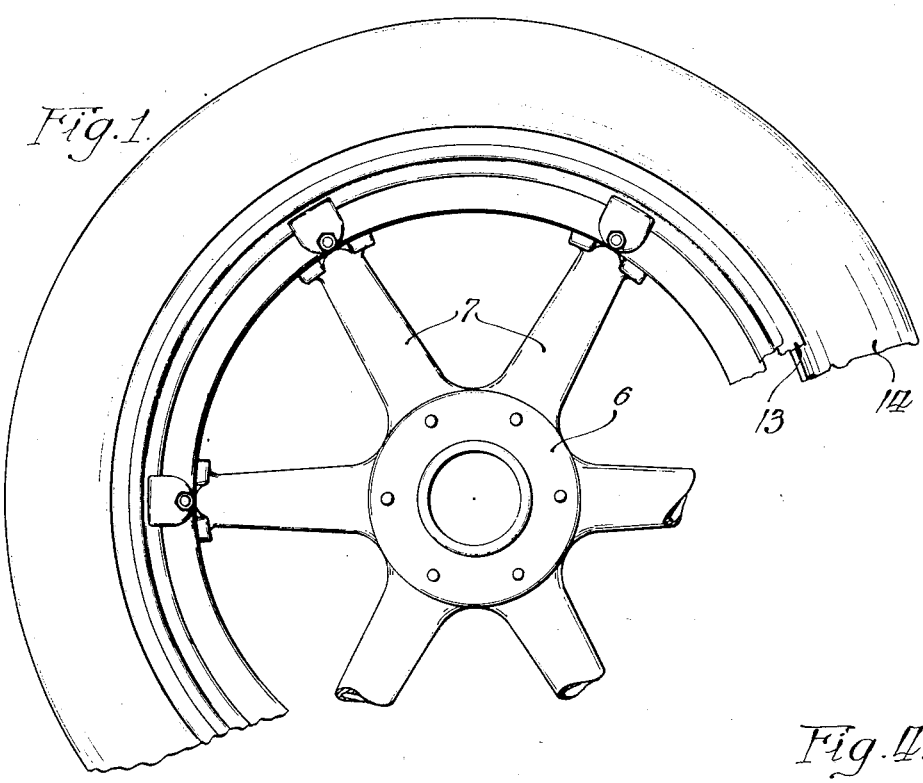
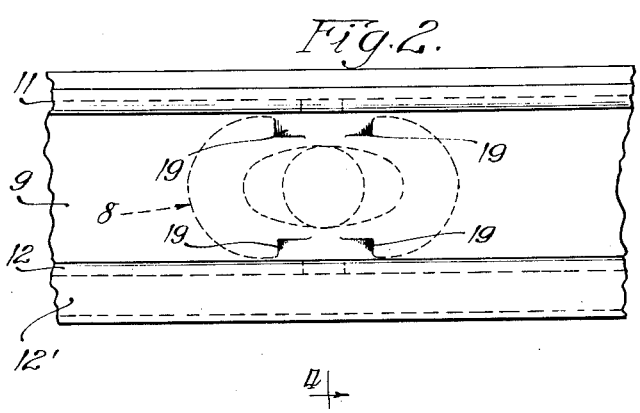
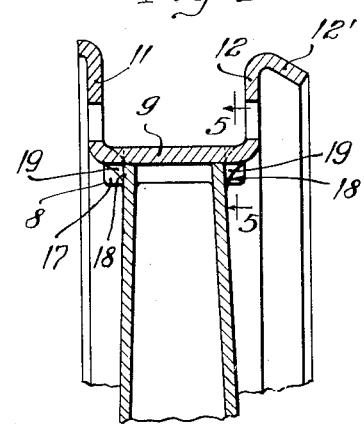
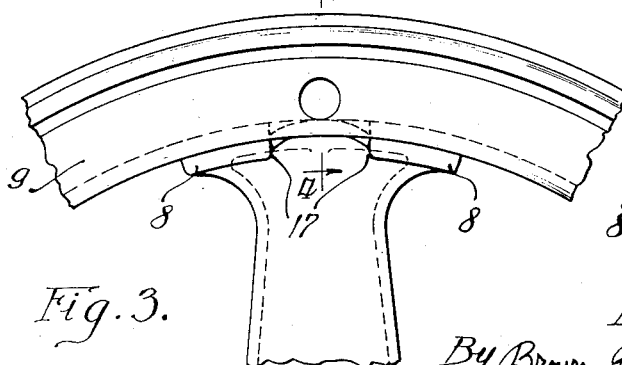
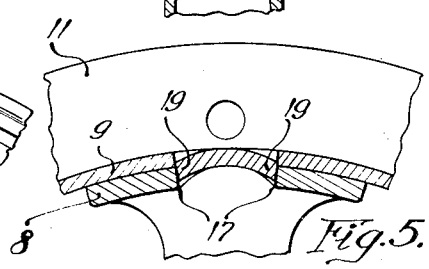
Inventor:
Frederick W. Burger.
By Brown, Jackson, Boettcher & Dienner
Attys.

Patented Dec. 19, 1933

1,939,952

UNITED STATES PATENT OFFICE 1,939,952

METAL WHEEL

Frederick W. Burger, Niles, Mich., assignor to Clark Equipment Company, Buchanan, Mich., a corporation of Michigan Application August 15, 1929. Serial No. 386,049

3 Claims. (Cl. 301—67)

The present invention relates to metal wheels and to an improved method of making the same, and has particular reference to spoke wheels and to the manner of joining the felloe or rim of the wheel to the ends of the spokes.

In the preferred embodiment of the invention, the wheel is built up or constructed from a cast metal spider, constituting a hub and hollow spoke structure, and from a continuous metal rim which is secured upon the outer ends of this hollow spoke structure. The rim is joined to the ends of the spokes by punching indentations or shoulders inwardly from the rim to engage the ends of the spokes, these shoulders locking the rim and spokes together against stresses acting longitudinally of the rim and against stresses acting transversely thereof.

The improved joint between the rim and each spoke is established after the spider has been pressed laterally into the rim, the preferred construction shown being of such nature as to permit the spider to be pressed into the continuous rim for the purpose of placing the spider under compression and the rim under tension before the joint is formed between the two. The finished wheel possesses practically all the advantages of a completely cast metal wheel, but at the same time is not subject to the objections which have generally been encountered in the manufacture of such wheels. The specific construction of one preferred embodiment of the invention will clearly appear from the following description thereof, taken in connection with the accompanying drawing in which:

Figure 1 is a side elevation showing the greater part of a wheel embodying my invention;

Figure 2 is a fragmentary elevational view from the outer side of the rim and looking inwardly into the channel periphery of the rim for illustrating the manner of forming the joints;

Figure 3 is a fragmentary side elevational view of the joint between the rim and the spoke structure;

Figure 4 is a transverse sectional view taken approximately on the plane of the line 4—4 of Figure 3, and Figure 5 is a detailed sectional view longitudinally of the rim, taken approximately on the plane of the line 5—5 of Figure 4.

The improved wheel comprises a hub and spoke structure cast as a unit, the spokes preferably being hollow and relatively thick and short and provided at their outer ends with pads or laterally extended seats adapted to receive and support the rim. The casting that constitutes the hub and spokes may be made of steel or malleable iron, and the rim or felloe is a rolled steel band of channel cross-section providing a tire-carrying rim, preferably of the demountable type. Referring to the drawing, 6 indicates the hub portion of the casting, 7 the spokes, and 8 the pads at the outer ends of these spokes which support the rim 9. The pads may be chamfered at one side on their outer margins to facilitate pressing the hollow spoke structure into the rim, if desired.

The rim is preferably of channel cross-section as shown in Figure 4, having relatively deep flanges 11 and 12 so that the rim has considerable strength to resist bending and crushing and will support a great load in tension.

Where this rim or felloe 9 is to support a demountable tire rim the flange 12 may be provided with an outwardly projecting flange extension 12' for receiving and seating the tire carrying rim. The side flanges 11 and 12 of the felloe may be provided with the usual aligned holes for receiving the clamping bolts and lugs which demountably support the rim 13 and its tire 14 on the felloe.

Prior to the assembly of the spider and felloe the spider is compressed and sized in suitable die apparatus, such, for example, as that disclosed in my copending application, Serial No. 49,162 filed August 10, 1925. Such operation compresses the spider radially and stores a potential or inherent elasticity in the molecular structure thereof. After the spider has been thus compressed and sized in this die apparatus it is pressed into the continuous felloe 9, such being preferably performed by a hydraulic press, although conceivably the felloe may be put upon the spider in any other preferred manner which will result in placing the felloe under considerable tension upon the outer ends of the spokes, which are thereby held in compression. The potential or inherent elasticity which is stored in the molecular structure of the spider by the above mentioned compressing and sizing operation is released by the action of vibration, with the result that the spider tends to return to its former size, thereby creating and maintaining a heavy pressure grip with the felloe surrounding the spoke ends.

Referring now to the next step of forming the improved joints between each spoke end and the felloe, it will be seen from Figures 2 and 3 that the pad or enlargement 8 is notched out at each side of the spider to form the two oppositely facing shoulders 17 extending transversely of the spoke and of the felloe at each side of the spoke or pad. As shown in Figure 4, the inner or back wall 18 of each notched out area preferably extends in a substantially straight line along the outer side of the hollow end of the spoke, this inner longitudinally extending surface 18 joining with the transversely extending shoulders 17 in substantially right angle corners. With the spider pressed into the felloe, portions of the felloe web are punched down into these corners of the notched out recesses in the side edges of the pads. As shown in Figure 2, a right angle tab of metal is punched downwardly from the felloe into each corner of the recess 17, 18. Preferably a separate one of these tabs or lugs, indicated at 19, is projected downwardly into each of the four corners of the two slotted recesses 17, 18. That is to say, the line of punching does not extend along the entire wall 18 but is only present at the angular ends or corners 17, as shown in Figures 2 and 3.

Such construction is preferable as is avoids weakening the sectional strength of the felloe web 9, but, if desired, the line of punching may be extended along the entire length of the wall 18. In this punching operation the pad 8 rests on a suitable support and the punch is brought down to shear the lugs or lips 19 downwardly out of the web 9, these lips 19 being formed in multiple or singly in the punching operation. The angular ends of the recesses 17, 18 form the female die for the lips 19 in the punching operation.

As shown in Figure 4, the two pairs of lugs 19 at each side of the felloe have their inner edges bearing against the inner walls 18 of the recesses, whereby the felloe is locked to the end of the spoke against stresses acting transversely of the felloe. As shown in Figure 3 the ends of these locking lugs 19 bear against the angular ends 17 of the recesses, whereby the felloe is locked to the spokes against stresses acting circumferentially or longitudinally of the felloe. Thus these recesses and locking lugs reinforce the joint previously established between the felloe and the spokes by having the felloe under continuous tension and the spider under continuous compression. The four indentations made in the web in shearing the lugs 19 downwardly therefrom are widely spaced from each other and do not weaken the felloe against the tension stresses established therein.

Having thus described my invention what I claim there as new and desire to secure by Letters Patent is:

1. In a metal wheel the combination with an integral hub and spoke structure of pads at the ends of the spokes, a felloe engaging over said pads, the side margins of said pads at the sides of the wheel having angular recesses notched out therein to provide shoulders extending parallel with the plane of the wheel and at right angles to the plane of the wheel, and four angular lugs punched inwardly from the web of the felloe over each spoke end having their angular edges engaging with said shoulders for locking the felloe to the spoke structure against stresses acting axially and circumferentially of the wheel.

2. In combination with a metal wheel comprising a cast metal hub and spoke structure, the spokes having separate enlargements at their outer ends, a wrought metal rim having a relatively thin cylindrical wall embracing the enlargements at the ends of the spokes, of a plurality of notches forming angular shoulders on certain of said enlargements adjacent the edges of the enlargements and at the sides of the spokes, portions of said rim adjacent said shoulders being sheared radially inwardly and forming angular spurs conforming to and engaging with the angular portions of said shoulders, there being a plurality of said angular spurs so positioned relative to said shoulders to positively lock said spoke structure and felloe against all stresses acting axially and circumferentially of the wheel.

3. In a metal wheel the combination with a hub and spoke structure, of pads at the ends of the spokes, a felloe engaging over said pads, marginal portions of the pads being provided with open-sided notches at the sides of the spokes, and lug means having portions sheared from the felloe and projected radially inwardly to engage within said notches for locking the felloe to the spoke structure.

FREDERICK W. BURGER.